United States Patent
S S et al.

(10) Patent No.: US 10,922,116 B2
(45) Date of Patent: Feb. 16, 2021

(54) CREATING OPERATING SYSTEM VOLUMES

(71) Applicant: HEWLETT PACKARD ENTERPRISE DEVELOPMENT LP, Houston, TX (US)

(72) Inventors: Harish S S, Karnataka (IN); Chandrashekar Shastri Pagadadinni Mata, Karnataka (IN); Jyothi N, Karnataka (IN); Niranjan D R, Karnataka (IN); Manasa C, Karnataka (IN); Uma Shankar V D, Karnataka (IN); Satish Kumar Narayan, Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 318 days.

(21) Appl. No.: 15/756,574

(22) PCT Filed: Apr. 28, 2016

(86) PCT No.: PCT/US2016/029792
§ 371 (c)(1),
(2) Date: Feb. 28, 2018

(87) PCT Pub. No.: WO2017/138967
PCT Pub. Date: Aug. 17, 2017

(65) Prior Publication Data
US 2018/0365046 A1    Dec. 20, 2018

(30) Foreign Application Priority Data
Feb. 12, 2016 (IN) .............................. 201641005079

(51) Int. Cl.
*G06F 9/44* (2018.01)
*G06F 9/455* (2018.01)
(Continued)

(52) U.S. Cl.
CPC ........ *G06F 9/45558* (2013.01); *G06F 1/3203* (2013.01); *G06F 9/4401* (2013.01);
(Continued)

(58) Field of Classification Search
CPC .. G06F 9/45558; G06F 9/4401; G06F 9/4411; G06F 2009/45579; G06F 2009/4557; G06F 2009/45562
See application file for complete search history.

(56) References Cited

U.S. PATENT DOCUMENTS 6,877,018 B2 *  4/2005  Oshins .................. G06F 9/4411
7,200,745 B2 *  4/2007  Schwartz, Jr. ........ G06F 9/4411
                                                    713/1

(Continued)

FOREIGN PATENT DOCUMENTS

CN       1443322 A     9/2003
CN    101443748 A     5/2009
(Continued)

OTHER PUBLICATIONS

Forbes Guthrie, "Understanding ESXI—Stateless, Diskless, Feckless," Feb. 20, 2011, pp. 1-11 [online], Retrieved from the Internet on Jul. 20, 2015 at URL: <vreference.com/2011/02/10./stateless-diskiess-and-feckless/>.
(Continued)

*Primary Examiner* — Benjamin C Wu
(74) *Attorney, Agent, or Firm* — Hewlett Packard Enterprise Patent Department

(57) ABSTRACT

Examples are provided for a device comprising a processor to create a volume in a memory. The volume may be based on an operating system (OS) image. The processor may: attach the OS image to a virtual machine, and attach the volume to the virtual machine as a disk of the virtual machine. The virtual machine may: boot using the attached
(Continued)

OS image, determine a version of the attached OS image, determine a set of advanced configuration power management interface (ACPI) tables for different permutations of hardware, store the set of ACPI tables corresponding to the hardware permutations in the attached volume, and modify the attached volume to create a modified volume based on the set of ACPI tables. The modified volume is bootable by the different permutations of hardware. The processor may further store the modified volume on the storage device.

13 Claims, 8 Drawing Sheets

(51) Int. Cl.
  *G06F 9/4401* (2018.01)
  *G06F 1/3203* (2019.01)
(52) U.S. Cl.
  CPC .... *G06F 9/4411* (2013.01); *G06F 2009/4557* (2013.01); *G06F 2009/45562* (2013.01); *G06F 2009/45579* (2013.01)

(56) References Cited

U.S. PATENT DOCUMENTS

| | | | | |
|---|---|---|---|---|
| 7,308,566 | B2* | 12/2007 | Michaelis | G06F 11/1658 713/1 |
| 7,600,111 | B2* | 10/2009 | Allison | G06F 9/4418 713/1 |
| 7,877,747 | B2* | 1/2011 | Magenheimer | G06F 9/4555 718/1 |
| 7,953,900 | B2* | 5/2011 | Qureshi | G06F 9/4411 710/8 |
| 8,370,618 | B1* | 2/2013 | Yakovlev | G06F 13/102 713/2 |
| 8,943,203 | B1 | 1/2015 | Lent et al. | |
| 2003/0110331 | A1* | 6/2003 | Kawano | G06F 1/24 710/58 |
| 2004/0030854 | A1* | 2/2004 | Qureshi | G06F 9/4411 711/170 |
| 2004/0030874 | A1* | 2/2004 | Qureshi | G06F 9/4411 713/1 |
| 2004/0186988 | A1* | 9/2004 | Polyudov | G06F 15/177 713/100 |
| 2004/0193701 | A1 | 9/2004 | Michaelis et al. | |
| 2004/0243534 | A1 | 12/2004 | Culter et al. | |
| 2005/0187719 | A1* | 8/2005 | Oshins | G06F 9/4411 702/19 |
| 2005/0223210 | A1 | 10/2005 | Sasaki et al. | |
| 2007/0094655 | A1 | 4/2007 | Rostampour | |
| 2008/0072028 | A1* | 3/2008 | Allison | G06F 9/24 713/1 |
| 2008/0082815 | A1* | 4/2008 | Kawano | G06F 1/24 713/2 |
| 2009/0271173 | A1 | 10/2009 | Vnukov | |
| 2010/0058319 | A1 | 3/2010 | Kawaguchi et al. | |
| 2011/0125996 | A1* | 5/2011 | Gattegno | G06F 9/4416 713/2 |
| 2011/0197053 | A1 | 8/2011 | Yan et al. | |
| 2012/0191929 | A1 | 7/2012 | Zietzke et al. | |
| 2013/0179856 | A1 | 7/2013 | Lam | |
| 2014/0033189 | A1 | 1/2014 | Buswell | |
| 2014/0181493 | A1 | 6/2014 | Deal et al. | |
| 2014/0181811 | A1 | 6/2014 | Tsirkin | |
| 2014/0208089 | A1 | 7/2014 | Satam et al. | |
| 2015/0121055 | A1* | 4/2015 | Zimmer | G06F 9/4403 713/2 |
| 2015/0268970 | A1* | 9/2015 | Mudusuru | G06F 9/4411 713/1 |
| 2017/0075682 | A1* | 3/2017 | Narasimhan | G06F 8/654 |
| 2017/0322852 | A1* | 11/2017 | Subramanya Iyer Srinivas Iyer | G06F 9/441 |

FOREIGN PATENT DOCUMENTS

| | | |
|---|---|---|
| CN | 101650660 A | 2/2010 |
| CN | 103189851 A | 7/2013 |
| CN | 103221919 A | 7/2013 |
| CN | 104508634 A | 4/2015 |

OTHER PUBLICATIONS

International Search Report and Written Opinion, International Application No. PCT/US2016/029792, dated Nov. 8, 2016, pp. 1-12, KIPO.

VMware, Inc., "VMware App Volumes Delivers Applications to Desktop Environments in Seconds. With the Click of a Button, It Can Provision Applications to Users and Desktop at Scale," 2015, pp. 1-5 [online], Retrieved from the Internet on Jul. 20, 2015 at URL: <vmware.com/in/products/appvolumes/features>.

* cited by examiner

CREATING OPERATING SYSTEM VOLUMES

BACKGROUND

A computing device may execute an operating system. An operating system may manage utilization of resources of the computing device.

BRIEF DESCRIPTION OF THE DRAWINGS

Certain examples are described in the following detailed description and in reference to the drawings, in which.

DETAILED DESCRIPTION

Operating system copies are distributed on a media e.g. floppy disk, CD-ROM, DVD, or USB storage device (universal serial bus). A computing device may provision itself i.e. install and configure an operating system (OS) using these media. Provisioning of a computing device using these media may be very time-consuming. As an example, it may take 30-50 minutes to setup an operating environment and provision the computing device. The length of the provisioning time is primarily due to the fact that the OS installer has to identify the chipset, processor, character encoding and peripherals associated with the computing device. The OS installer further has to define and allocate the structure of the bootable volume.

This disclosure describes techniques for constructing OS volumes that are "stateless," i.e. that do not depend on the underlying hardware, in order to reduce provisioning time. These stateless volumes may be installed on, and booted by computing devices regardless of the underlying hardware. The proposed system constructs the stateless volumes based on an OS image e.g., an OS image in an ISO/CD/DVD format. The volumization process produces small volumes that are about the same size as the original OS media. By provisioning servers using the stateless volumes, computing devices may be provisioned on a wide variety of different hardware configurations in a matter of seconds rather than in thirty-plus minutes.

Figure 1:
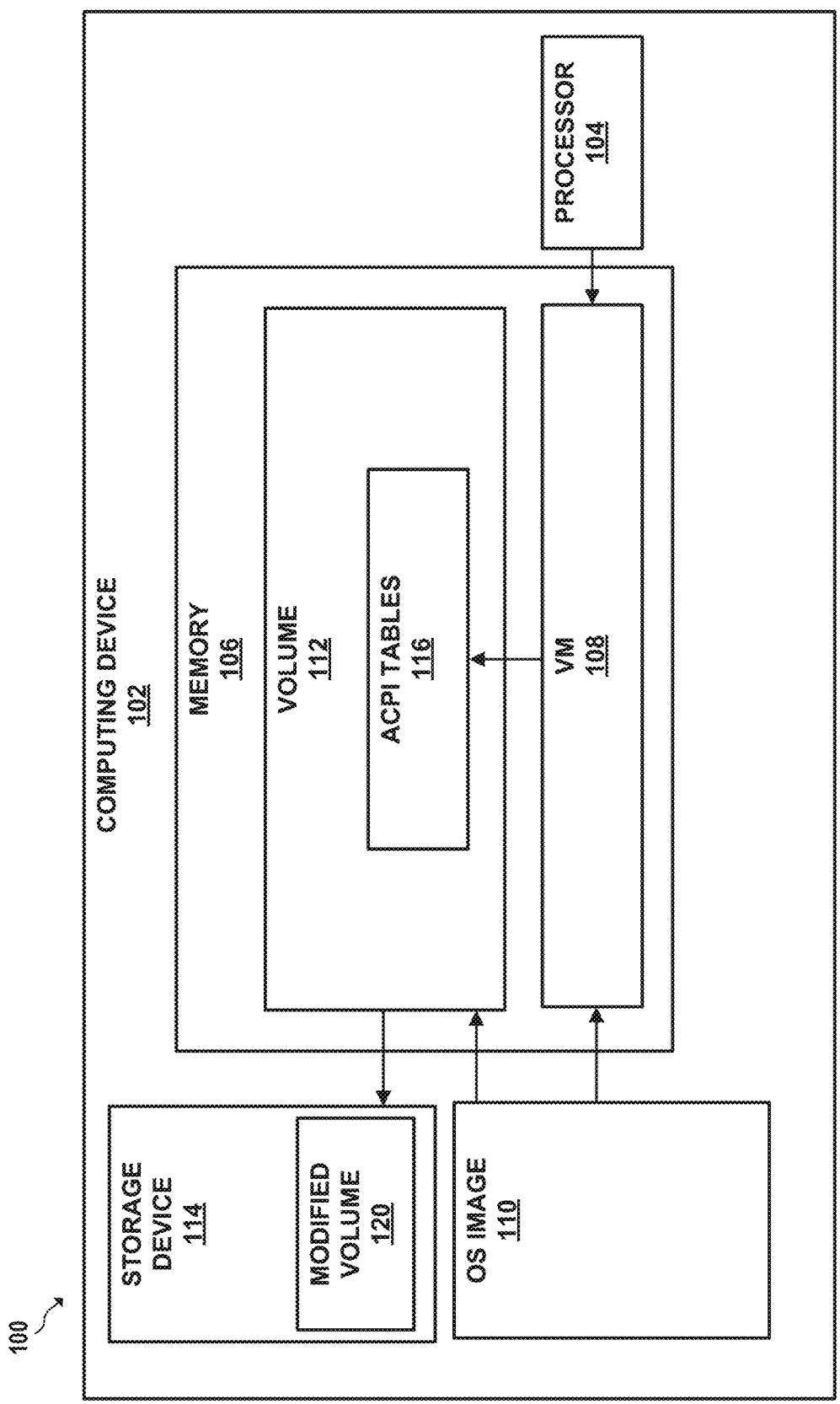
FIG. 1 is a conceptual diagram of an example computing system that may create operating system volumes.

FIG. 1 is a conceptual diagram of an example computing system that may assemble operating system volumes. Computing system 100 is illustrated in FIG. 1. Computing system 100 comprises a computing device 102. In some examples, computing device 102 may be a server, such as a media server used to provision computing devices.

Computing device 102 further comprises a memory 106, a storage device 114, an OS image 110, and a processor 104. Memory 106 may comprise a volatile or non-volatile memory, such as dynamic random access memory (DRAM) or an extremely fast non-volatile memory, such as resistive ram (ReRAM), memristor memory, or the like.

Processor 104 may comprise a central processing unit (CPU), application-specific integrated circuit (ASIC), field programmable gate array (FPGA), or the like, or any combination thereof. Storage device 114 may comprise a logical or physical storage device, such as a storage area network (SAN), storage array, hard drive, solid state drive, the like, or any combination thereof.

Computing device 102 has access to OS image 110. OS image 110 may be an image, such as an ISO (international standards organization) image stored on storage device 114 in some examples. In some examples, OS image 110 may comprise media such as a CD or DUD that is via a drive coupled with computing device 102.

Computing device 102 may construct stateless volumes, i.e. perform volumization in accordance with techniques described herein. To perform volumization, processor 104 of computing device 102 may create volume 112 in memory 106. Processor 104 may create volume 112 as a memory-mapped file by using system calls in various examples. Processor 104 creates volume 112 based on OS image 110. More particularly, Processor 104 may create volume 112 by copying files from OS image 110 into locations within volume 112. In some examples, processor 104 may copy files from OS image 110 into volume 112 such that there are no free sectors in volume 112.

As will be described in greater detail, volume 112 appears as a file on storage device 114, but portions of volume 112 are stored at least temporarily, in memory 106. Storing volume 112 in memory 106 allows for faster access to volume 112. Periodically, processor 104 may cause portions of volume 112 to be written to storage device 114. If the size of volume 112 is greater than memory 106, only a portion of volume 112 is stored in memory 106, and processor 104 executes a scrolling window algorithm to regions of memory 106 to logical addresses on storage device 114.

Processor 104 also executes a virtual machine (VM) 108 in memory 106. UM 108 is generic and may consume no more than 16 megabytes of memory 106 in some examples. Processor 104 may execute UM 108 and construct volume 112 in parallel in various examples. Processor 104 causes UM 108 to boot based on OS image 110. UM 108 boots off of OS image 110 to determine the version of OS image 110. For example, UM 108 may determine that OS image 110 is a version of Windows, Linux, or a UM host, as some examples. Processor 104 also causes volume 112 to be attached (e.g. mounted as a drive, such as a virtual hard drive or disc drive) on UM 108. In various examples, processor 104 may begin execution of VM 108 before or after attaching volume 112 and/or OS image 110 to UM 108.

Generally, an OS volume, such as volume 112 is not bootable on different permutations or configurations of hardware devices. One reason that a volume is not bootable by multiple different hardware configurations is that an OS reads a set of advanced configuration power interface (ACPI) tables from an ACPI-compatible device at boot-time. The set of ACPI tales indicate power management and configuration information about various system devices, such as the processor and interrupt controllers. An OS manages the power configuration and utilization of the devices present based on the set of ACPI tables.

An OS then retains a local copy of the ACPI tables for quick reference. However, the OS's local set of ACPI tables contain device entries that are specific to the ACPI-compatible devices present in the computing device on which the OS is installed. Thus, when the same OS volume is booted on a computing device that has a different ACPI hardware configuration (i.e. different ACPI devices), the OS's stored set of ACPI table differs from the set of ACPI tables of the different hardware and the OS volume becomes unbootable because the OS lacks the information to control the power configuration of the different hardware.

To avoid volume corruption and to allow booting on multiple hardware configurations, VM 108 builds a set of ACPI tables 116. VM 108 constructs ACPI tables 116 to cover multiple different hardware or configurations as described in greater detail herein. More particularly, based on OS image 110 and/or for example, unattended installation files, VM 108 may determine hardware devices that may be present in hardware permutations of computing devices to which volume 112 may be deployed. More particularly, VM 108 may determine a set of ACPI tables corresponding to every ACPI-compatible hardware device (e.g., processors, chipsets, network controllers and the like) that may be present in the determined hardware permutations. VM 108 stores the determined set of ACPI tables in volume 112 such that when volume 112 is booted, the OS reads the set of ACPI tables 116 and has the appropriate ACPI-information for each ACPI-compatible device in the computing device.

Responsive to storing ACPI tables 116, VM 108 may modify volume 112 to create modified volume 120. Processor 104 stores modified volume 120 on storage device 114 by copying volume 112 from memory 106 to storage device 114. In order to reduce the space consumed by volume 112, VM 108 may modify the structure of volume 112 such that volume 112 has no free sectors. Responsive to VM 108 generate ACPI tables 116, processor 104 may terminate VM 108 to free the resources associated with VM 108.

In this manner, computing system 100 represents an example computing device 102 that may create a volume 112 in memory 106 using a scrolling window memory algorithm, wherein volume 112 is based on an OS image 110. Processor 104 may attach (e.g. mount as a drive, such as a virtual hard drive or disc drive) OS image 110 to virtual machine 108, and attach volume 112 to VM 108 as a disk of the virtual machine.

VM 108 may boot using the attached OS image 110. VM 108 may further determine a set of advanced configuration power management interface (ACPI) tables 116 for a plurality of different permutations of hardware, store the set of ACPI tables 116 corresponding to the permutations in the attached volume 112, and modify the attached volume to create modified volume 120 on storage device 114 based on the set of ACPI tables 116. Modified volume 120 may be bootable by any of the plurality of different permutations of hardware. Processor 104 may further store modified volume 120 on storage device 114 responsive to virtual machine 108 modifying attached volume 112.

Figure 2:
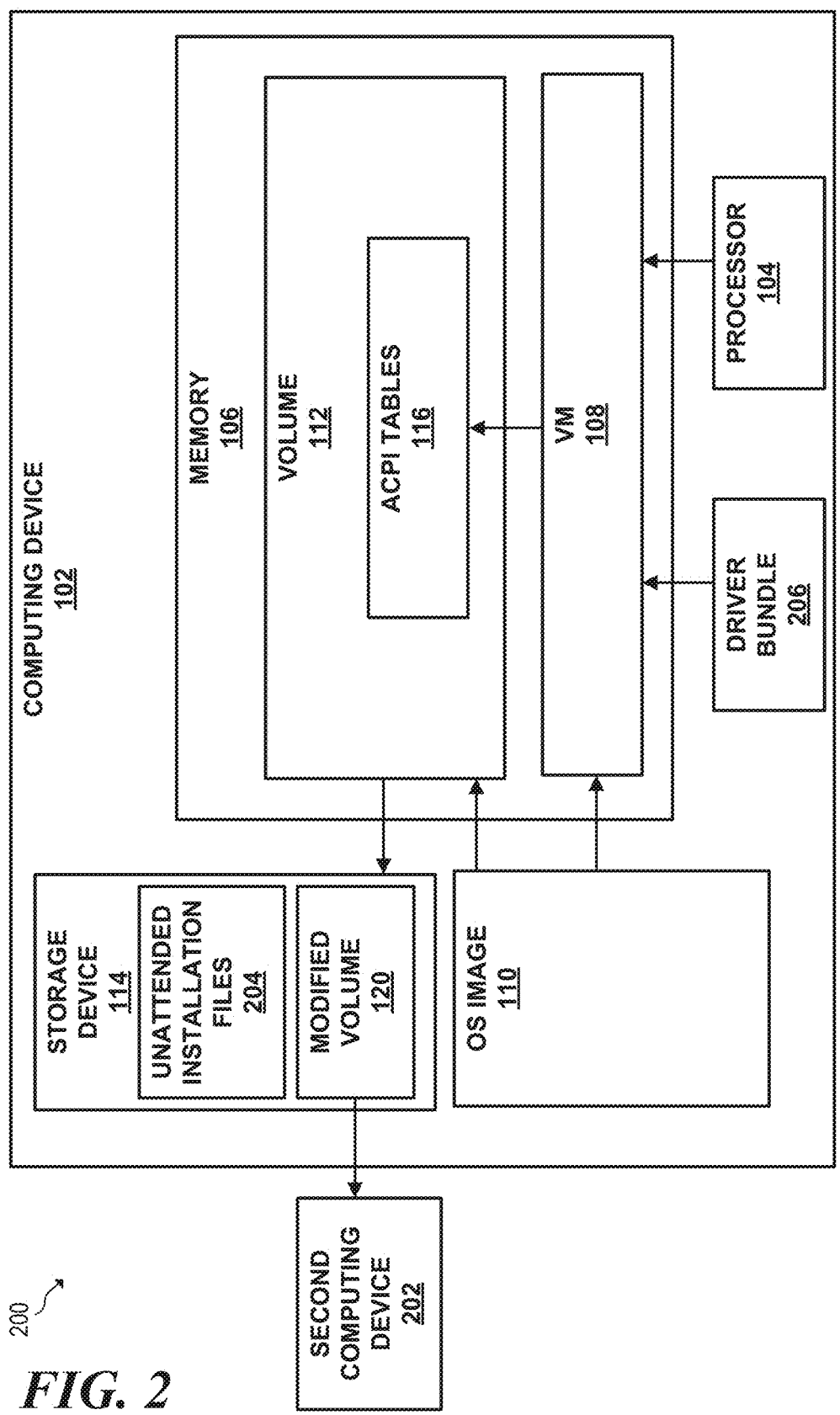
FIG. 2 is another conceptual diagram of an example computing system that may create operating system volumes.

FIG. 2 is another conceptual diagram of an example computing system that may perform creation of operating system volumes. FIG. 2 illustrates a computing system 200. Computing system 200 comprises computing device 102 as illustrated in FIG. 1, as well as a second computing device 202, and unattended installation files 204. As described above with respect to FIG. 1, computing device 102 may generate modified volume 120, based on ACPI tables 116. Modified volume 120 is bootable on the different permutations of hardware.

In FIG. 2, computing device 102 further comprises driver bundle 206. Driver bundle 206 comprises a plurality of drivers. Driver bundle 206 may comprise drivers that are associated with hardware devices that may be present in different permutations of hardware to which modified volume 120 may be deployed.

Processor 104 may supply, and VM 108 may receive, driver bundle 206 to while VM 108 is executing. In various examples, UM 108 may determine ACPI-compatible devices based on driver bundle 206, and may determine at least part of ACPI tables 116 based on the determined ACPI-compatible devices. In various examples, VM 108 may store at least some of the drivers of driver bundle 206 in volume 112. VM 108 may determine which drivers to store based on information about the hardware permutations which may be deployed. In the example where volume 112 is a new volume, VM 108 may store the drivers of driver bundle 206 contiguously in volume 112.

Once volume 112 has been modified to create modified volume 120, computing device 102 may deploy modified volume 120. In some examples, to deploy modified volume 120, processor 104 may transfer modified volume to a second computing device 202, which is to be provisioned. In various examples, processor 104 may apply unattended installation files 204 to modified volume 120 at deploy time. Unattended installation files 204 may be stored on storage device 114 in some examples. Unattended installation files 204 may indicate information such as one or more of a hostname or a network configuration for second computing device 202 in some examples. Unattended installation files 204 may indicate a filesystem, and/or a size of modified volume 120 in some examples. Responsive to the transfer of modified volume 120 being transferred and/or unattended installation files 204 are applied, second computing device 202 may be bootable.

Figure 3:
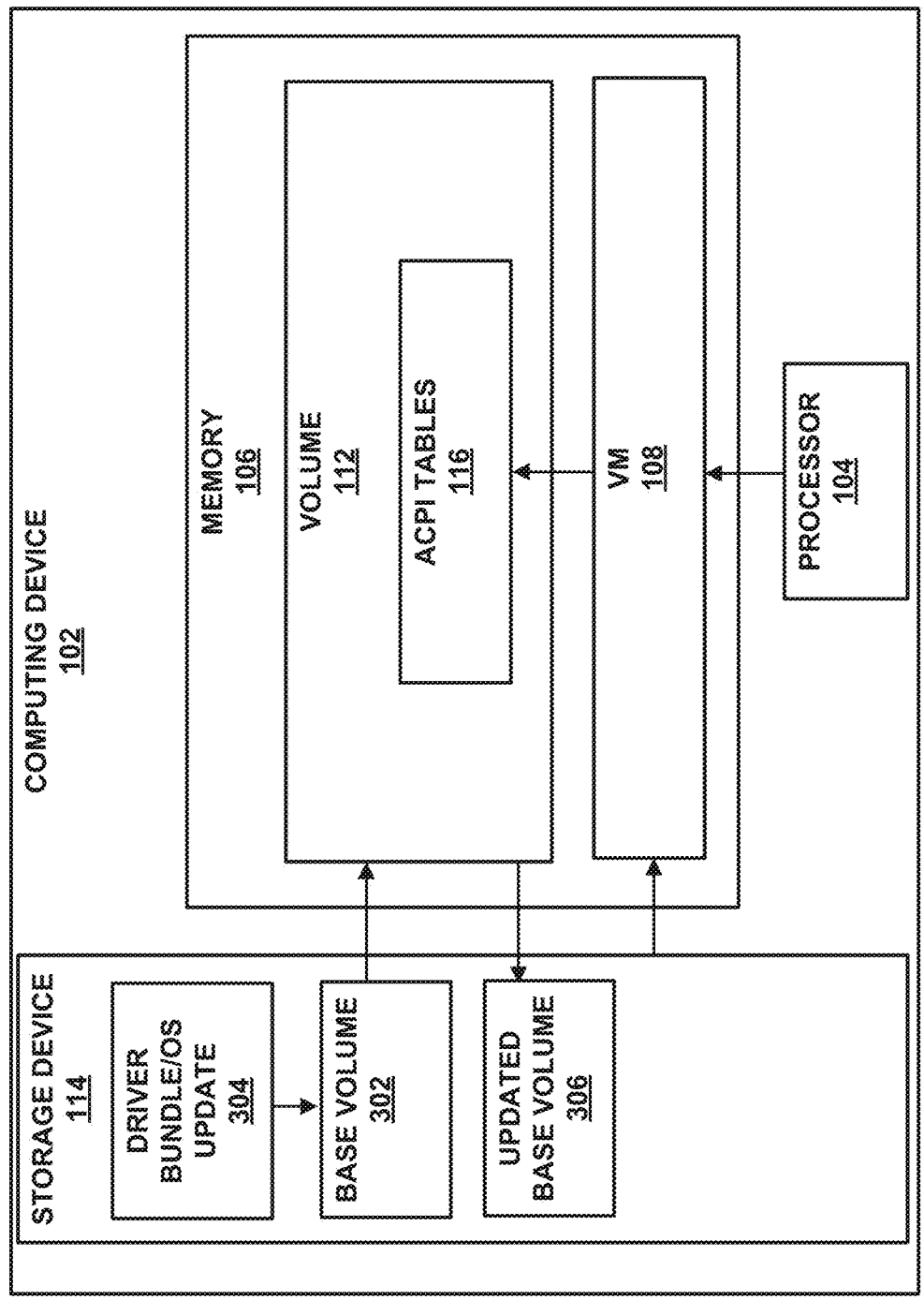
FIG. 3 is another conceptual diagram of an example eating computing system that may create operating system volumes.

FIG. 3 is a conceptual diagram that may illustrate an example of constructing operating system volumes. FIG. 3 illustrates a computing system 300. Computing system 300 comprises computing device 102 of FIG. 1. In addition to the components illustrated in FIG. 1, computing system 300 further comprises a base volume 302. Base volume 302 may be similar to modified volume 120.

In some examples, OS developers and/or device manufacturers may release operating system updates or driver updates after an initial volume has been modified. Driver bundle/OS update 304 comprises such a new driver bundle or OS update. Systems administrators may wish to apply driver bundle/OS update 304 to a modified volume, e.g. for testing, without destroying the previous volume.

The techniques of this disclosure enable computing device 102 to perform versioning on stateless OS volumes, thereby enabling a version of a volume that is based on a previous version of that same volume. In the example of FIG. 3, storage device 114 may store base volume 302, which may represent an initial version of a volume. Later, an administrator may apply driver bundle/OS update 304 to base volume 302. The administrator may apply driver bundle/OS update 304 by executing and supplying driver bundle/OS update 304 to VM 108.

Based on driver bundle/OS update 304 VM 108 may modify the set of ACPI tables 116, and/or volume 112 to generate an updated base volume 306, which is based on base volume 302. In the example that VM 108 writes additional drivers to volume 112, VM 108 may insert a pointer at the end location of the last set of drivers. The pointer indicates another address, e.g. the end of volume 112, which is an address at which volume 112 stores the additional drivers from driver bundle/OS update 304.

Figure 4:
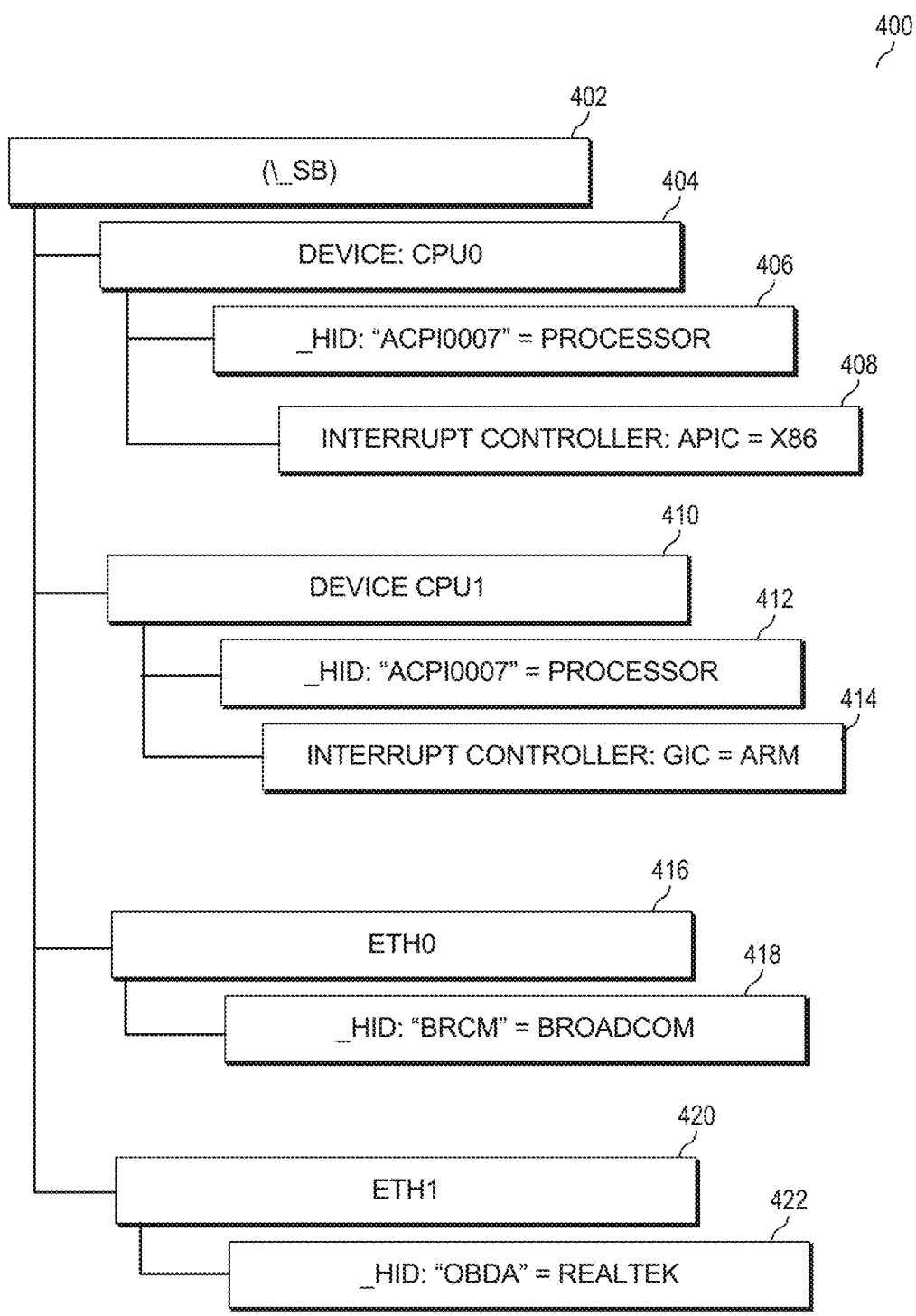
FIG. 4 is a conceptual diagram illustrating an example of an advanced configuration power interface (ACPI) table.

FIG. 4 is a conceptual diagram illustrating an example of an ACPI table. FIG. 4 illustrates ACPI tables 400. ACPI tables 400 may comprise a portion of the set of ACPI tables 116 as illustrated in FIGS. 1-3. ACPI tables 400 illustrate a portion of the ACPI table, referred to as the system bus (402).

ACPI devices, such as processors, peripheral component interconnect express (PCIe) bridges, graphics cards, and network cards may be defined in ACPI tables 400 relative to the "_SB" (system bus) namespace 402. As described above, VM 108 may generate entries in ACPI tables 400 to support different permutations of hardware. In some examples, VM 108 may generate ACPI tables for devices that are present, and are not actually present in a computing device to be provisioned.

In the example of FIG. 4, VM 108 may determine that an ARM processor or an Intel processor may be present in two different hardware permutations. VM 108 may generate and compile ASL (ACPI source language) to generate ACPI entries for device 404 corresponding to the Intel x86 processor, as well as device 410, corresponding to an ARM processor.

Device 404 further comprises a (hardware ID) 406 equal to the value "ACPI0007," which indicates that device 404 is a processor as opposed to another type of device. Device 404 may be further associated with an ACPI table entry 408, corresponding to an advanced programmable interrupt controller, which may be present in x86 systems, thereby indicating that device 404 is an x86 processor.

If VM 108 determines that an ARM processor may be present in some systems to be provisioned, VM 108 may include device 410, named "CPU1." Device 410 further comprises a "_HID" (hardware ID) 412 equal to the value "ACPI0007," which indicates that device 410 is a processor as opposed to another type of device. Device 410 may be further associated with an ACPI table entry 414, corresponding to a generic interrupt controller (GIC), which may be present in ARM systems, thereby indicating that device 410 is an ARM processor.

In various examples, VM 108 may determine that multiple ACPI-compliant network cards from different vendors may be present in different hardware configurations of computing devices to be provisioned using the same volume. For example, VM 108 may determine e.g. based on OS image 110, a driver bundle, and/or various unattended installation files, that one configuration of a computing device to be provisioned has a NIC made by Broadcom, while another hardware configuration has a NIC made by a different, e.g. Realtek.

To support the Broadcom NIC, VM 108 may generate an ACPI table device entry for ACPI device 416, named "eth0," and a hardware ID entry 418 with the value "BRCM," which indicates that device is made by Broadcom. To support the Realtek NIC, VM 108 may generate an entry for ACPI device 420, named "eth0," and a hardware ID entry 422 with the value "OBDM," which indicates that the MC is made by Realtek. VM 108 may store device entries 416, 418, 420, and 422 in ACPI tables 116.

Thus, in some examples, VM 108 may determine a set of ACPI tables for devices that exist in one hardware configuration but not in another hardware configuration. For example, a computing device to be provisioned may comprise an x86 processor or an ARM processor, but not both. Yet, VM 108 may generate a set of ACPI tables in volume 112 that include both types of processors to be compatible with either architecture using the same volume. Similarly, a computing device to be provisioned may comprise a NIC made by Broadcom or by Realtek, but not both. To cover either case, VM 108 may generate ACPI device entries 416, 420 and store ACPI device entries 416, 420 in ACPI tables 116 even though both devices may not be present.

VM 108 may also store drivers corresponding to the ACPI-compatible devices illustrated in FIG. 4 volume 112. For example, VM 108 may store drivers for an ARM processor, Intel processor, ARM processor, Broadcom NIC and Realtek NIC in volume 112. VM 108 may store the drivers such that the OS kernel, when executed, is able to determine the location of the driver corresponding to each ACPI device. Examples of drivers include ".sys" files on Windows and ".ko" files on Linux.

In various examples, VM 108 may store drivers for devices, such as Plug-and-Play (PnP) devices, which are not ACPI-compliant devices, in volume 112. Such PnP devices do not have ACPI entries and are recognized by an OS kernel during boot time or upon device installation. The operating system of the provisioned system installs the appropriate driver for the PnP device and automatically allocates resources to the PnP device as long as the proper driver is present on the OS volume. Thus, so long as VM 108 inserts the appropriate driver for a PnP device into volume 112, the provisioned OS installs the appropriate driver, and the PnP device will operate properly.

Figure 5:
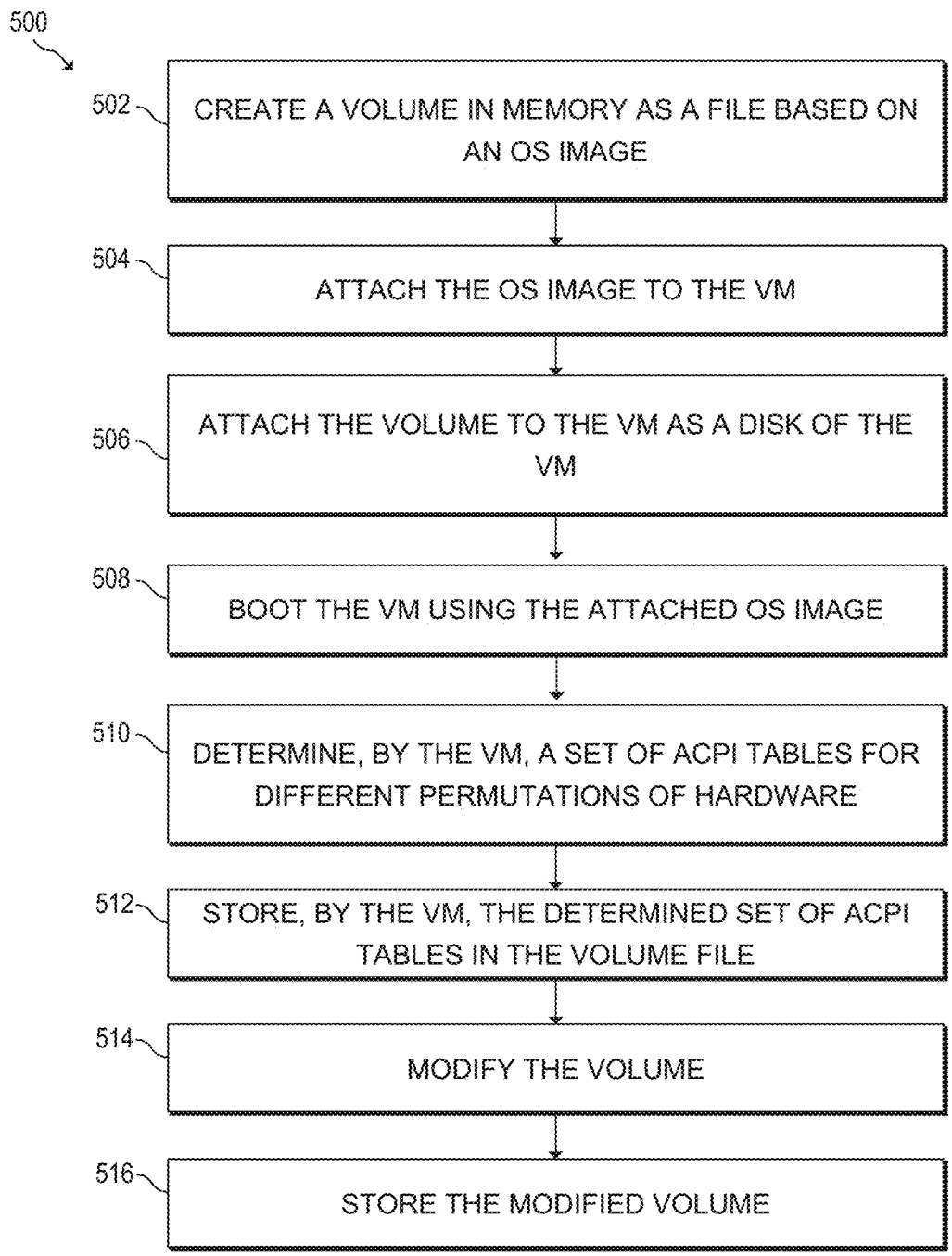
FIG. 5 is a flowchart of an example method for creating operating system volumes.

FIG. 5 is a flowchart of an example method for constructing operating system volumes. FIG. 5 comprises method 500. Method 500 may be described below as being executed or performed by a system, for example, computing system 100 (FIG. 1), computing system 200 (FIG. 2), or computing system 300 (FIG. 3). In various examples, method 500 may be performed by hardware, software, firmware, or any combination thereof. Other suitable systems and/or computing devices may be used as well. Method 500 may be implemented in the form of executable instructions stored on at least one machine-readable storage medium of the system and executed by at least one processor of the system. Alternatively or in addition, method 500 may be implemented in the form of electronic circuitry (e.g., hardware). In alternate examples of the present disclosure, one or more blocks of method 500 may be executed substantially concurrently or in a different order than shown in FIG. 5. In alternate examples of the present disclosure, method 500 may include more or fewer blocks than are shown in FIG. 5. In some examples, one or more of the blocks of method 500 may, at certain times, be ongoing and/or may repeat.

Method 500 may start at block 502 at which point a computing device of the computing system, e.g. processor 104 of computing device 102, may create a volume 112 in memory 106 as a file, wherein the volume is based on an operating system (OS) image (e.g. OS image 110).

At block 504, processor 104 may attach the OS image to the virtual machine. At block 506, processor 104 may attach the volume file to the VM as a disk of the VM. At block 508, the VM may boot using the attached OS image.

At block 510, VM 108 determines a set of ACPI tables (e.g., ACPI tables 116) for different permutations of hardware. At block 512, the VM may store the determined set of ACPI tables in the volume file. At block 514, the VM may modify the volume based on the set of ACPI tables. The modified volume is bootable by any of the permutations of hardware. At block 516, the computing device (e.g. processor 104) may store the volume on a storage device (e.g. storage device 114) of the computing device.

Figure 6:
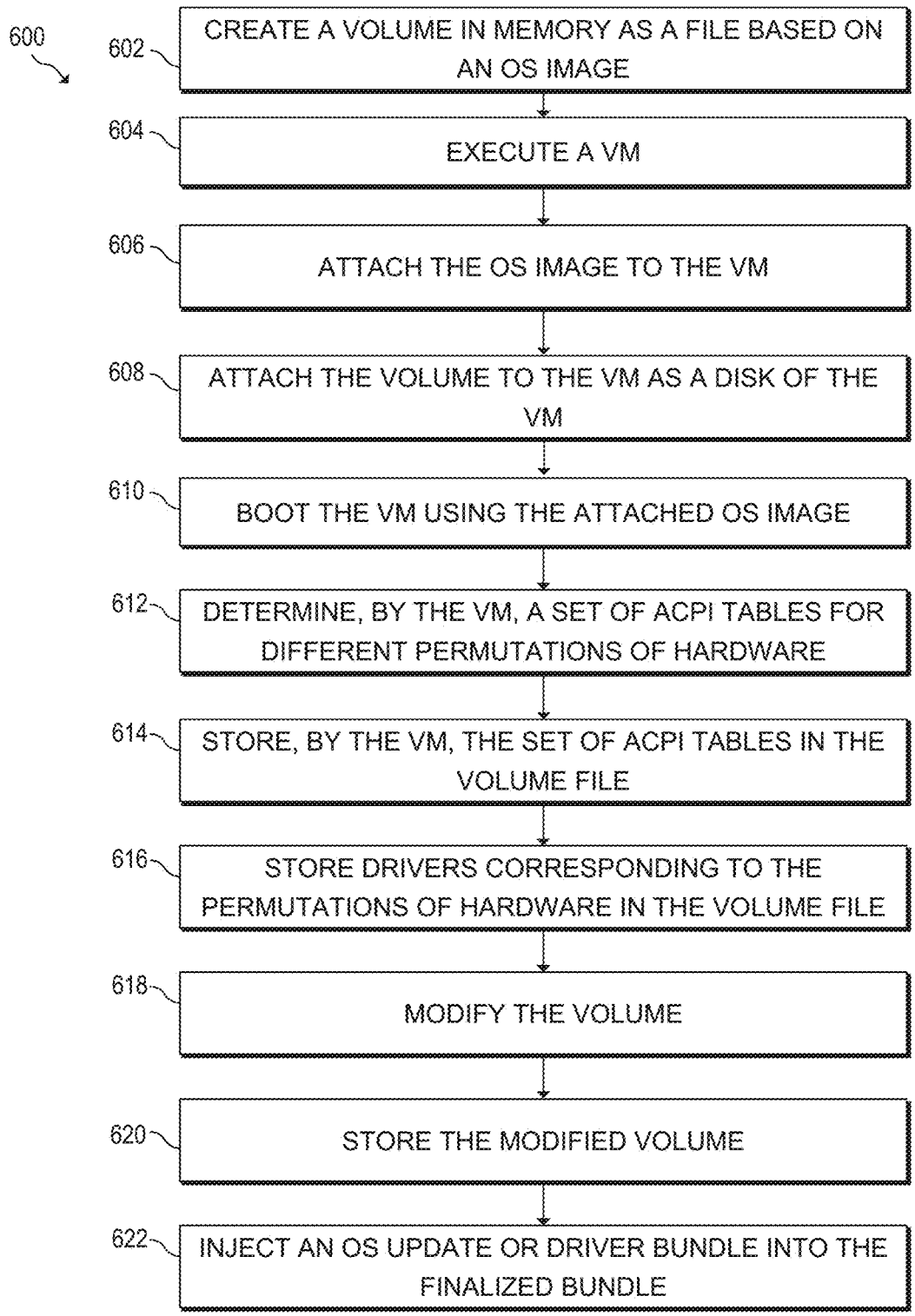
FIG. 6 is a flowchart of an example method for creating operating system volumes.

FIG. 6 is a flowchart of an example method for assembling operating system volumes. FIG. 6 illustrates method 600. Method 600 may be described below as being executed or performed by a system, for example, computing system 100 (FIG. 1) or computing system 200 (FIG. 2). Other suitable systems and/or computing devices may be used as well. Method 600 may be implemented in the form of executable instructions stored on at least one machine-readable storage medium of the system and executed by at least one processor of the system. Method 600 may be performed by hardware, software, firmware, or any combination thereof.

Alternatively or in addition, method 600 may be implemented in the form of electronic circuitry (e.g., hardware). In alternate examples of the present disclosure, one or more blocks of method 600 may be executed substantially concurrently or in a different order than shown in FIG. 6. In alternate examples of the present disclosure, method 600 may include more or fewer blocks than are shown in FIG. 6. In some examples, one or more of the blocks of method 600 may, at certain times, be ongoing and/or may repeat.

Method 600 may start at block 602 at which point a computing device of the computing system, e.g. processor 104 of computing device 102, may create a volume 112 in memory 106 as a file, wherein the volume is based on an operating system (OS) image (e.g. OS image 110).

At block 604, processor 104 may execute a virtual machine (e.g. VM 108) in various examples. In some examples, processor 104 may execute the VM after attaching the OS image and/or attaching the volume to the VM. At block 606, processor 104 may attach the OS image to the virtual machine. At block 608, processor 104 may attach the volume file to the VM as a disk of the VM. At block 610, the VM may boot using the attached OS image.

Method 600 may proceed to block 612, at which point the VM determines a set of ACPI tables (e.g., ACPI tables 116) for different permutations of hardware. In some examples, to determine the set of ACPI tables, the UM may receive a driver bundle comprising a plurality of drivers, and determine the set of ACPI tables based on the drivers of the driver bundle. At block 614, the VM may store the determined set of ACPI tables in the volume file. In some examples, at block 616, the VM may store drivers corresponding drivers corresponding to the permutations of hardware in the volume file.

At block 618, the VM may modify the volume based on the ACPI tables. The modified volume is bootable by any of the permutations of hardware. At block 620, the computing device (e.g. processor 104) may store the volume on a storage device (e.g. storage device 114) of the computing device. In some examples, at block 622, after the volume has been modified, the VM may inject at least one of: an update to the OS or an additional driver bundle into the modified bundle.

Figure 7:
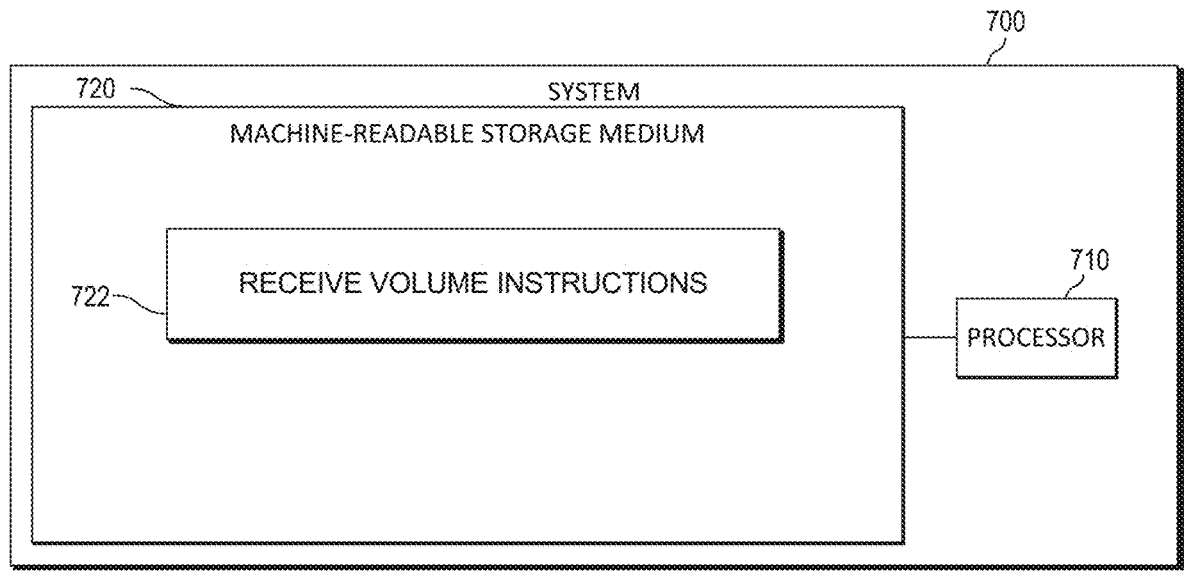
FIG. 7 is a block diagram of an example for creating operating system volumes.

FIG. 7 is a block diagram of an example for assembling operating system volumes. In the example of FIG. 7, system 700 includes a processor 710 and a machine-readable storage medium 720. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 710 may be one or more central processing units (CPUs), microprocessors, and/or other hardware devices suitable for retrieval and execution of instructions stored in machine-readable storage medium 720. In the particular example shown in FIG. 7, processor 710 may fetch, decode, and execute instructions 722 to construct OS volumes.

As an alternative or in addition to retrieving and executing instructions, processor 710 may include one or more electronic circuits comprising a number of electronic components for performing the functionality of one or more of the instructions in machine-readable storage medium 720. With respect to the executable instruction representations (e.g., boxes) described and shown herein, it should be understood that part or all of the executable instructions and/or electronic circuits included within one box may, in alternate examples, be included in a different box shown in the figures or in a different box not shown.

Machine-readable storage medium 720 may be any electronic, magnetic, optical, or other physical storage device that stores executable instructions. Thus, machine-readable storage medium 720 may be, for example, Random Access Memory (RAM), an Electrically-Erasable Programmable Read-Only Memory (EEPROM), a storage drive, an optical disc, and the like. Machine-readable storage medium 720 may be disposed within system 700, as shown in FIG. 7. In this situation, the executable instructions may be "installed" on the system 700. Alternatively, machine-readable storage medium 720 may be a portable, external or remote storage medium, for example, that allows system 700 to download the instructions from the portable/external/remote storage medium.

Referring to FIG. 7, receive OS volume instructions 722 when executed by a processor, e.g. processor 710, may cause processor 710 to receive, by a computing device (e.g. second computing device 202 or the like), an operating system (OS) volume that is bootable on different permutations of hardware. The OS volume is bootable on different permutations of hardware based on a set of ACPI tables stored in the OS volume. The received OS volume may comprise a set of ACPI tables comprising device entries for devices that are present in the computing device and device entries for devices that are not present in the computing device. The received OS volume may further comprise drivers associated with the devices that are present in the computing device and are not present and are not present in the computing device.

Figure 8:
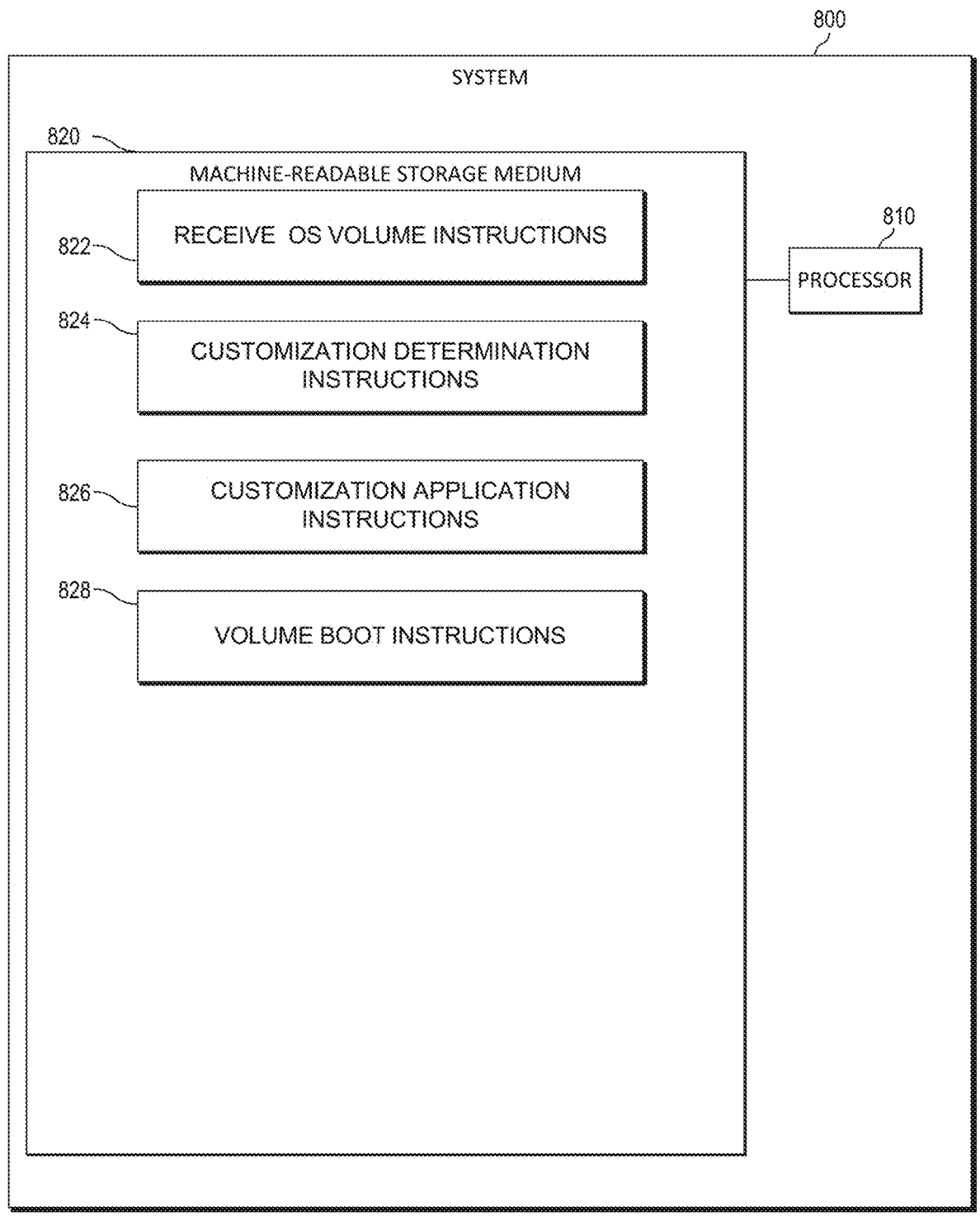
FIG. 8 is a block diagram of an example for creating operating system volumes.

FIG. 8 is a block diagram of an example for assembling operating system volumes. In the example of FIG. 8, system 800 includes a processor 810 and a machine-readable storage medium 820. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 810 may be one or more central processing units (CPUs), microprocessors, and/or other hardware devices suitable for retrieval and execution of instructions stored in machine-readable storage medium 820. In the particular example shown in FIG. 8, processor 810 may fetch, decode, and execute instructions 822, 824, 828, 828 to construct OS volumes.

As an alternative or in addition to retrieving and executing instructions, processor 810 may include one or more electronic circuits comprising a number of electronic components for performing the functionality of one or more of the instructions in machine-readable storage medium 820. With respect to the executable instruction representations (e.g., boxes) described and shown herein, it should be understood that part or all of the executable instructions and/or electronic circuits included within one box may, in alternate examples, be included in a different box shown in the figures or in a different box not shown.

Machine-readable storage medium 820 may be any electronic, magnetic, optical, or other physical storage device that stores executable instructions. Thus, machine-readable storage medium 820 may be, for example, Random Access Memory (RAM), an Electrically-Erasable Programmable Read-Only Memory (EEPROM), a storage drive, an optical disc, and the like. Machine-readable storage medium 820 may be disposed within system 800, as shown in FIG. 8. In this situation, the executable instructions may be "installed" on the system 800. Alternatively, machine-readable storage medium 820 may be a portable, external or remote storage medium, for example, that allows system 800 to download the instructions from the portable/external/remote storage medium.

Referring to FIG. 8, receive OS volume instructions 822 when executed by a processor, e.g. processor 810, may cause processor 810 to receive, by a computing device (e.g. second computing device 202 or the like), an operating system (OS) volume that is bootable on different permutations of hardware. The OS volume is bootable on different permutations of hardware based on a set of ACPI tables stored in the OS volume. The received OS volume may comprise set of ACPI tables comprising device entries for devices that are present in the computing device and device entries for devices that are not present in the computing device. The received OS volume may further comprise drivers associated with the devices that are present in the computing device and are not present and are not present in the computing device.

Customization determination instructions 824, when executed, may cause processor 810 to determine, by the computing device, customizations for the received OS volume. In various examples the customizations may comprise at least one of: a network configuration, a hostname, a file system, or a size of the OS volume. In some examples, processor 810 may execute customization application instructions 826. Customization application instructions 826, when executed, may cause processor 810 to apply the customizations to the OS volume, and volume boot instructions 828, when executed, may cause processor 810 to boot the OS volume responsive to applying the customizations to the volume.

The invention claimed is:

1. A method, comprising:
creating, by a computing device, a volume as a file in memory, wherein the volume is based on an operating system (OS) image;
executing a virtual machine;
attaching the OS image to a virtual machine;
attaching the file to the virtual machine as a disk of the virtual machine;
booting the virtual machine using the attached OS image;
determining, by the virtual machine, a set of advanced configuration power management interface (ACPI) tables for different permutations of hardware;
storing, by the virtual machine, the set of ACPI tables in the file;
modifying, by the virtual machine, the volume based on the set of determined ACPI tables such that the modified volume is bootable by any of the different permutations of hardware; and
storing, by the computing device, the modified volume on a storage device of the computing device.

2. The method of claim 1, wherein determining the set of ACPI tables further comprises:
receiving, by the virtual machine, a driver bundle comprising a plurality of drivers; and
determining, by the virtual machine, the set of ACPI tables based on the driver bundle.

3. The method of claim 1, comprising:
executing, by the processor, the virtual machine; and
storing, by the virtual machine, drivers corresponding to the permutations of hardware in the volume file.

4. The method of claim 1, comprising:
after the volume has been modified, injecting, by the virtual machine, at least one of: an update to the OS or an additional driver bundle into the modified bundle.

5. A computing device comprising:
a processor;
a memory;
a storage device and the processor to:
create a volume in the memory using a scrolling window memory algorithm, wherein the volume is based on an operating system (OS) image;
attach the OS image to the virtual machine; and
attach the volume to the virtual machine as a disk of the virtual machine;
wherein the virtual machine to:
boot using the attached OS image;
determine a set of advanced configuration power management interface (ACPI) tables for different permutations of hardware;
store the set of ACPI tables corresponding to the hardware permutations in the attached volume; and
modify the attached volume to create a modified volume based on the set of determined ACPI tables such that the modified volume is by any of the different permutations of hardware,
wherein the processor further to:
store the modified volume on the storage device responsive to the virtual machine finalizing the attached volume.

6. The computing device of claim 5, wherein to determine the set of ACPI tables, the virtual machine further to:
determine ACPI hardware devices that may be in any of the hardware permutations; and
generate the set of ACPI tables for all of the ACPI hardware devices,
wherein to store the set ACPI tables, the virtual machine further to:
store, in the attached volume, the set of ACPI tables for all of the ACPI hardware devices.

7. The computing device of claim 5, wherein the virtual machine further to:
determine drivers associated with the permutations of hardware; and
store the associated drivers in the attached volume.

8. The computing device of claim 5,
wherein the volume comprises an original volume,
the computing device further to:
inject into the base volume at least one of: an update to the OS, or additional drivers to produce an updated base volume; and
store the updated volume.

9. The computing device of claim 5, wherein the processor further to:
begin execution of the virtual machine.

10. The computing device of claim 5, the computing device further to:

transfer the modified volume to a second computing device, wherein the transferred volume is bootable by the second computing device responsive to completion of the transfer.

11. A non-transitory machine-readable storage medium encoded with instructions, the instructions that, when executed, cause a processor to:

receive, by a computing device, an operating system (OS) volume that is bootable on different permutations of hardware, wherein the OS volume is bootable on different permutations of hardware based on a set of ACPI tables stored in the OS volume, wherein the received OS volume comprises the set of ACPI tables comprising device entries for hardware devices that are not present in the system and device entries for hardware devices that are present in the computing device, and wherein the received OS volume comprises drivers associated with the hardware devices that are present in the computing device and drivers associated with the hardware devices that are not present in the computing device, wherein the received OS volume has no free sectors.

12. The non-transitory machine-readable storage medium of claim 11, determine, by the computing device, customizations for the OS volume, wherein the customizations comprise at least one of:

a network configuration, a hostname, a file system, or a size of the OS volume;

apply the customizations to the OS volume; and boot the OS volume responsive to applying the customizations to the volume.

13. The non-transitory machine-readable storage medium of claim 11, wherein the at least some of the drivers are stored contiguously in the received OS volume.

\* \* \* \* \*